United States Patent [19]
Gérard

[11] 4,027,751
[45] June 7, 1977

[54] NOISE-REDUCING SPRING FOR A DISC BRAKE

[75] Inventor: Jean-Louis Gérard, Paris, France

[73] Assignee: Societe Anonyme D.B.A., Paris, France

[22] Filed: Dec. 17, 1975

[21] Appl. No.: 641,412

[52] U.S. Cl. .............................................. 188/73.5
[51] Int. Cl.² ...................................... F16D 65/12
[58] Field of Search .............. 188/73.5, 73.6, 73.3, 188/205 A, 72.4, 206 R, 72.5, 73.1, 73.4

[56] References Cited

UNITED STATES PATENTS

| 3,638,765 | 2/1972 | Flaherty et al. | 188/73.5 |
| 3,684,061 | 8/1972 | Ogawa et al. | 188/73.5 |
| 3,942,612 | 3/1976 | Marchand et al. | 188/73.6 |

FOREIGN PATENTS OR APPLICATIONS

| 46-42252 | 12/1971 | Japan | 188/73.5 |

Primary Examiner—Trygve M. Blix
Assistant Examiner—Douglas C. Butler
Attorney, Agent, or Firm—Paul David Schoenle; Ken C. Decker; William N. Antonis

[57] ABSTRACT

A disc brake of the type comprising a torque-taking member associated with an actuator is adapted to urge at least one friction element against a rotary disc. The friction element comprises a backing plate carrying a friction lining and anchors by its backing plate against guiding surfaces formed on the torque-taking member. An anti-noise spring cooperating with the friction element and with the torque member comprises a lock fixing the anti-noise spring axially with respect to the backing plate. A first portion of the spring traverses an aperture formed in the backing plate and cooperates with a second portion of the spring in such a way that the spring forms with the friction element a subassembly removable as a unit from the remainder of the brake.

8 Claims, 12 Drawing Figures

NOISE-REDUCING SPRING FOR A DISC BRAKE

BACKGROUND OF THE INVENTION

The invention relates to a disc brake.

More particularly, the invention concerns a disc brake of the type comprising a torque-taking member associated with actuating means adapted to urge at least one friction element against a rotary disc, said friction element comprising a backing plate carrying a friction lining, said backing plate anchoring against guiding surfaces formed on the torque-taking member, at least one anti-noise spring cooperating with said friction element and with said torque-taking member.

Disc brakes of this type have generally a noise-reducing spring to prevent two friction elements from vibrating when they make contact with the disc, and to hold these elements in place relative to the guiding surfaces associated with the torque-taking member. Unfortunately, however, the spring generally used is normally difficult to install in the brake and it unbalances the friction elements relative to the guiding surfaces, so that the brake does not operate satisfactorily when the friction elements are made to slide along the guiding surfaces.

SUMMARY OF THE INVENTION

To overcome these disadvantages, the invention proposes a disc brake of the above-mentioned type in which the spring comprises means to lock it axially with respect to said backing plate, a first portion of said spring traversing an aperture formed in said backing plate and cooperating through releasable locking means with a second portion of said spring, in such a way that the spring forms with said friction element a sub-assembly removable as a unit from the remainder of the brake.

According to a particular embodiment of the invention, said locking means are comprised of a hook formed on said first portion and engaging said second portion of the spring. According to another embodiment of the invention, the spring is a resilient wire, said means to lock it axially comprising at least two first arms substantially parallel therebetween and disposed adjacent the respective faces of the backing plate, and at least a second arm constituting said first spring portion, said second arm extending from one of the first arms and cooperating through said locking means with the other of said first arms, which thereby constitute said second spring portion.

According to still another embodiment of the invention, the spring cooperates with at least one anchoring surface formed on the torque-taking member through a third curved and convex portion.

BRIEF DESCRIPTION OF THE DRAWINGS

Two embodiments of the invention will now be described by way of examples with reference to the accompanying drawings, in which.

DESCRIPTION OF THE PREFERRED EMBODIMENTS

Figure 1:
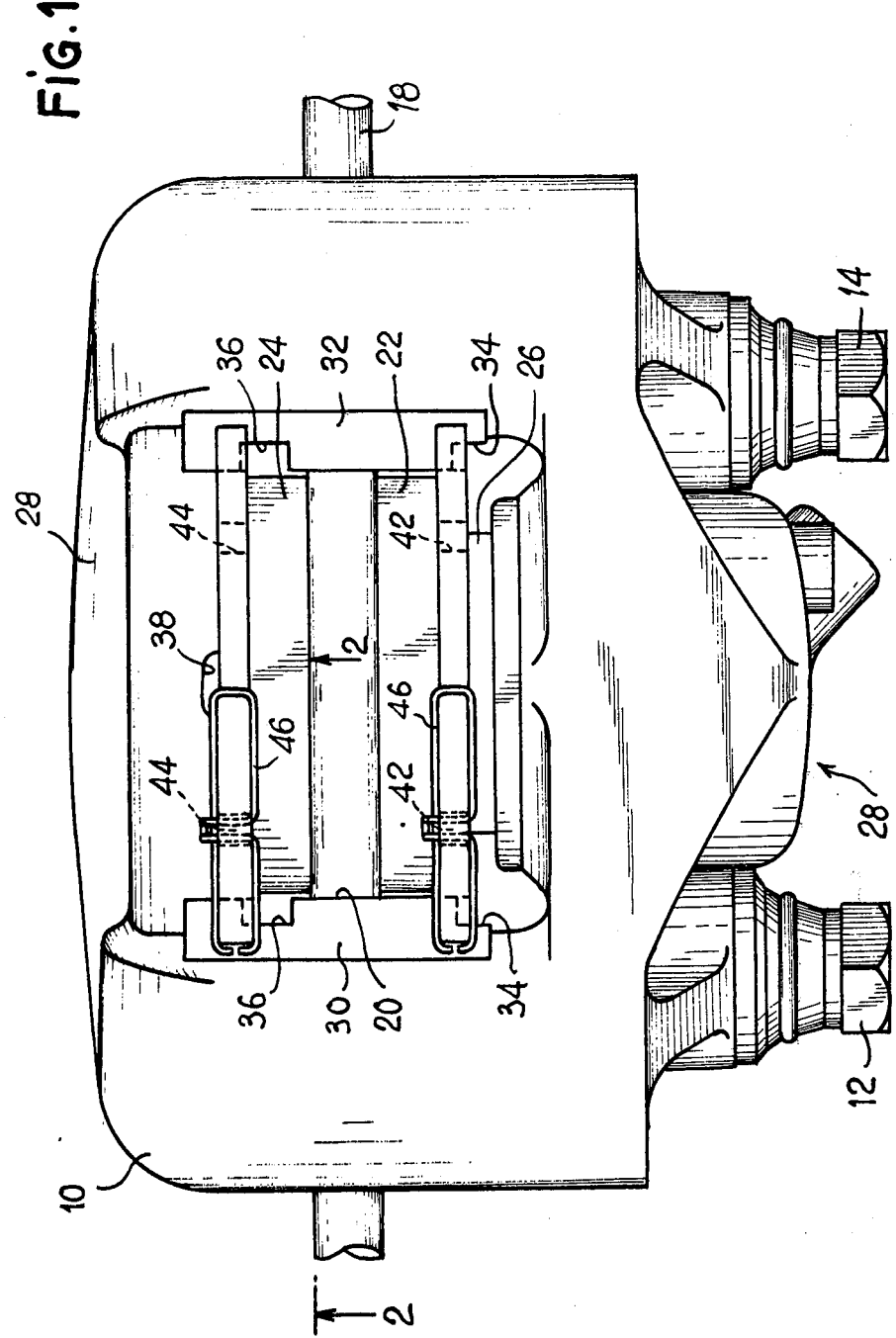
FIG. 1 represents a plan view of a disc brake embodying the principle of the invention.
Figure 2:
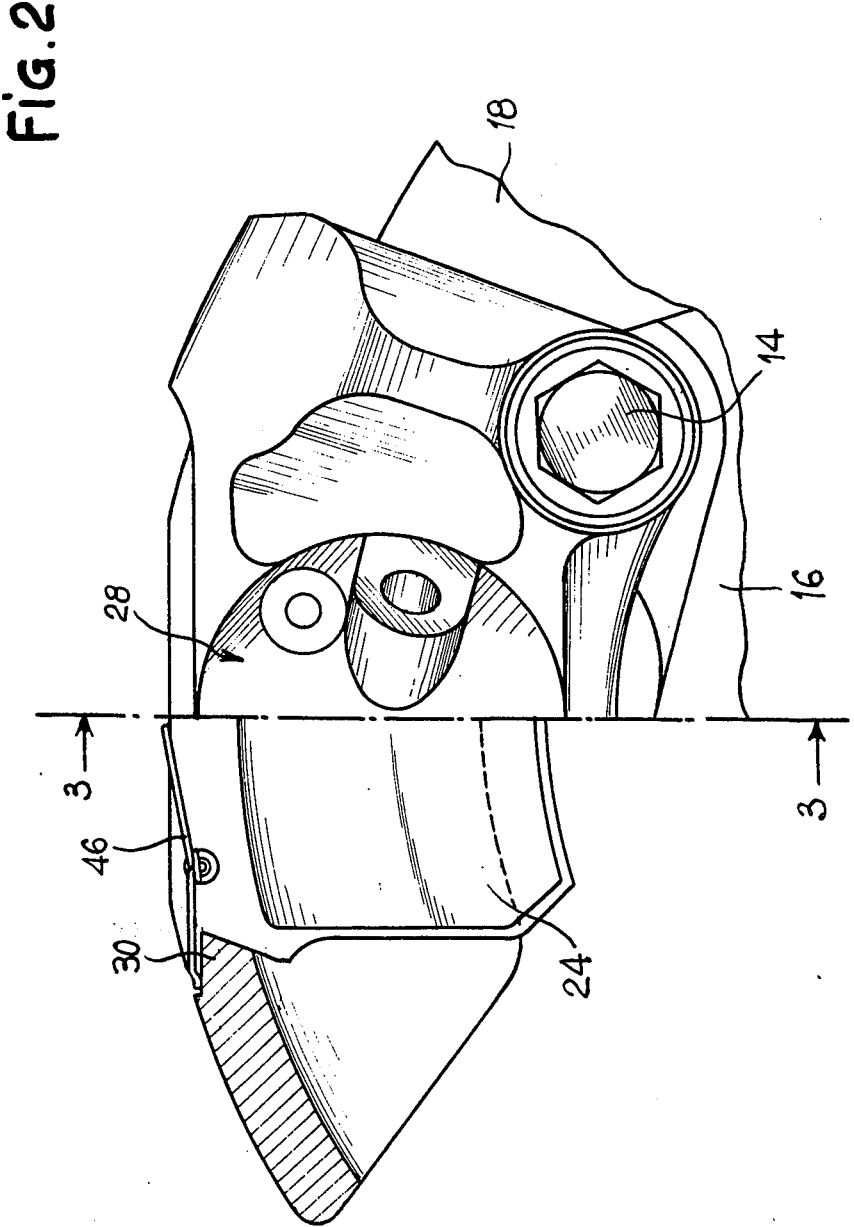
FIG. 2 is a view half in section along a line 2–2 in FIG. 1.
Figure 3:
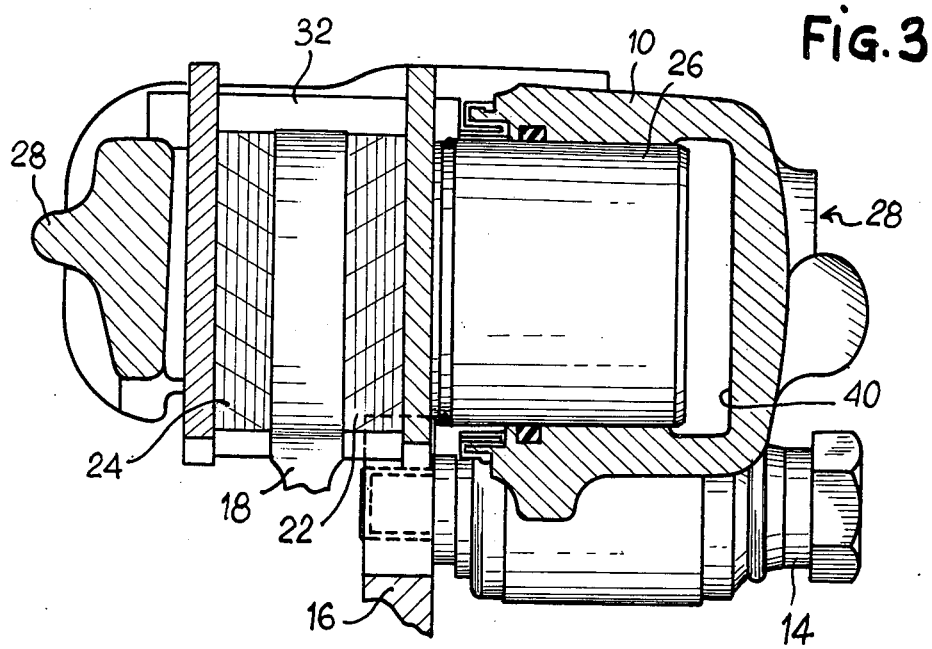
FIG. 3 represents a section along a line 3–3 in FIG. 2.

FIGS. 1 to 3 illustrate by way of example a disc brake having a caliper 10 slidable by way to two columns 12, 14 on a fixed support 16 attachable to a fixed portion of the vehicle (not shown). The caliper 10 straddles a rotary disc 18 designed to be associated with a wheel of the vehicle. The portion of the caliper 10 straddling the disc contains an aperture 20. The caliper 10 acts as a torque-taking member for two friction elements 22, 24. The friction element 22 is operated directly by the piston 26 of a brake actuator 28 associated with the caliper 10 whereas the friction element 24 is associated with the reaction portion 28 of the caliper 10 so that it is applied to the disc by reaction when the brake actuator 28 operates. The friction elements 22, 24 are braced against guiding surfaces formed on axial key members 30, 32 which constitute the axial edges of the aperture 20.

Slots 34, 36 are provided in the key members 30, 32 to permit installation and removal of the friction elements 22, 24 respectively. To this end the width of the slots slightly exceed the thickness of the backing plates of the friction elements, and the distance separating the bottoms of mutually opposite slots slightly exceeds the circumferential width of each friction element. In addition; the slots 36 are offset towards the disc relative to the position normally occupied by the friction element 24, and a slot 38 is provided in the reaction portion 28 of the caliper so that the friction element 24 can be disengaged and so escape radially through the slots 36. Similarly, the slots 34 are offset away from the disc relative to the friction element 22, by a distance less than the clearance existing in the idle position between the piston 26 and the end of its bore 40, so that the friction element 22 can escape radially through the slots 34 when the piston 26 has retracted to the end of the bore 40.

In the embodiment illustrated, each of the key members 30, 32 against which the brake pads 22, 24 are braced in each direction of rotation of the disc 18 is formed by a surface substantially parallel to the force generated when the friction linings on the elements 22, 24 make contact with the disc 18 and by a surface inclined relative to plane perpendicular to this force at an angle of which the tangent substantially equals the distance separating the centre of this inclined surface from the line of application of the force generated during braking, divided by the distance separating the centres of the surfaces parallel to the force from the inclined surfaces formed on the opposite key members 30, 32, in a direction parallel to the force generated during braking. This feature makes it possible to minimize the dimensions of the surfaces constituting the key members 30, 32 for a given size of brake.

Each friction element 22, 24 contains in its upper part, to which the lining does not extend, two apertures or holes on 42, 44 respectively. The friction elements are substantially symmetrical relative to the radial plane passing through the point of application of the tangential force generated during braking.

Figure 4:
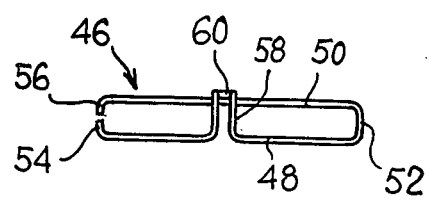
FIG. 4 is a plan view of the noise-reducing spring used in the brake shown in FIGS. 1 to 3.
Figure 5:
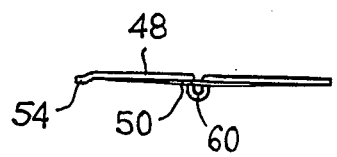
FIG. 5 is a side view of the spring shown in FIG. 4.

A noise-reducing spring 46 is associated with each of the friction elements 22, 24 and with the torque-taking member 10. The springs 46, which are shown most clearly in FIGS. 4 and 5, are formed of a resilient filament, preferably of metal, such as piano wire. Each spring 46 substantially forms a rectangle of which the two long sides are constituted by a first portion 48 and a second portion 50 extending circumferentially close to the faces of the backing plate of the associated friction element. The two short sides of each spring are constituted by a third, axial portion 52, which comes to bear on the outer edge of the backing plate of the respective friction element, and by the free ends 54, 56 of the portions, 48, 50, which ends are bent back towards one another and come to bear on an anchoring surface formed on the torque-taking member 10 and constituted in this embodiment by the outwardly directed surface of the key member 30 (that is, the surface directed outwards from the brake). The portion 48 also includes a U-shaped part 58 which passes through one of the holes 42, 44 in the backing plates of the friction elements 22, 24 respectively. The U-shaped part 58 divides the portion 48 into two substantially equal parts and extends axially beyond the portion 50 to form an abutment for the latter, so that the U-shaped part 58 is urged resiliently to abut on the upper art of the hole 42, 44 due to the initial tension stored in the portion 48, 50 when the portion 52 and ends 54, 56 are bearing on the upper edge of the backing plate and on the abutment surface provided on the caliper 10. The end 60 of the U-shaped part 58 is bent radially inwards into the brake to form a hook, so as to hold the portion 50. The ends 54, 56 of the portions 48, 50 are also bent radially inwards into the brake, so that they seat firmly on the outer surface of the key member 30. The portions 48, 50 are spaced by an axial distance substantially equalling the thickness of the backing plate of the associated friction element, so that the spring is immobilized axially relative to this element. In the embodiment described, the spring portion 52 bears on the outer edge of the backing plate near the radial plane passing through the point of application of the force generated during frictional contact between the associated friction element and the disc 18, and each friction element 22, 24 is substantially symmetrical relative to this plane. When the spring is unstressed, as shown in FIGS. 4 and 5, the portions 48, 50 are substantially straight. When the spring is installed in the brake, however, the portions 48, 50 form a V directed inwards into the brake (FIG. 2).

The brake just described with reference to FIGS. 1 to 6 operates as follows:

The various components of the brake occupy the position shown in FIGS. 1 to 3 when the brake is idle and when the linings on the friction elements 22, 24 are new. Upon operation of the brake actuator 28, brake fluid is introduced into the chamber defined by the piston 26 and bore 40, so that the piston 26 urges the friction element 22 directly on to a first side of the disc 18 and, due to reaction, slides the caliper 10 along the columns 12, 14 so as to urge the friction element 24 on to the other side of the disc. The springs 46 meanwhile act as noise-reducing springs for the friction elements 22, 24 and the fact that they are substantially symmetrical relative to the front and rear faces of each friction element facilitates sliding of the element 22 along the key members 30, 32.

Figure 6:
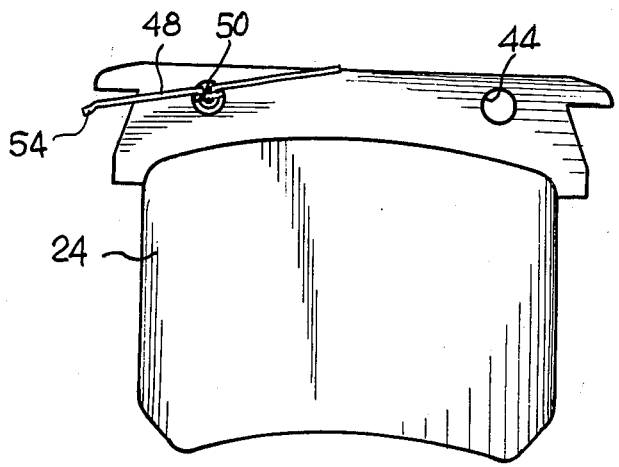
FIG. 6 illustrates how a brake pad and noise-reducing spring may be assembled before being installed in the brake shown in FIGS. 1 to 3.
Figure 7:
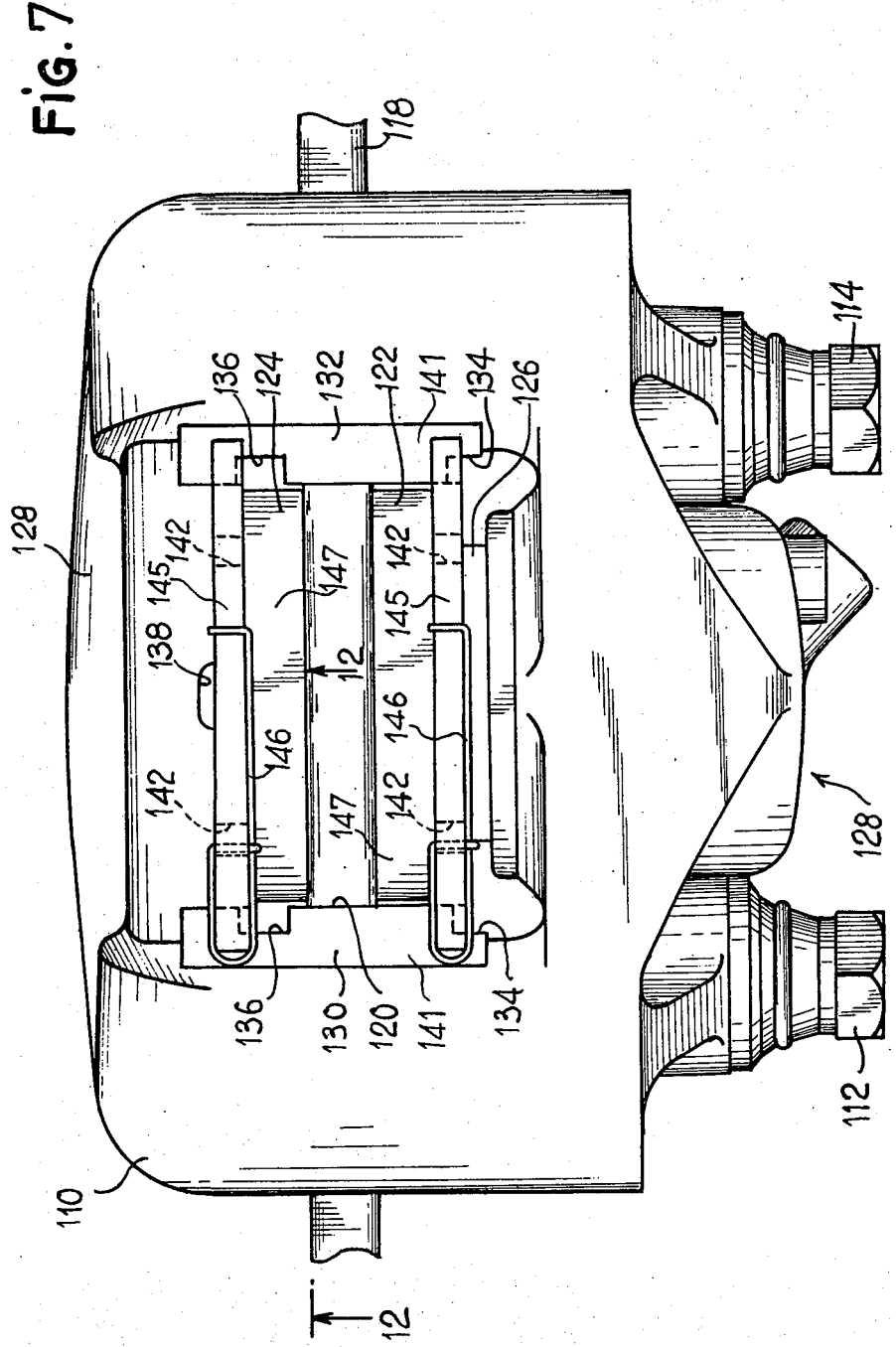
FIG. 7 represents a plan view of another disc brake embodying the principle of the invention.

Application of the springs 46 to each friction element is very simple and can be done either before or after the friction elements are placed on the key members. FIG. 6 illustrates a friction element, of the same type as elements 22 and 24, with a spring 46 mounted on it. To apply the spring, its portion 50 is disengaged from the hook-forming portion 60, so that the U-shaped part 58 can be inserted in the corresponding slot 42 or 44. The portion 50 is now placed beneath the hook 60 to releasably engage the portion 50 thereto, so that the spring is locked on to the friction element. It only remains to put the assembly comprising the spring and friction element on the brake, if the spring has been applied before installation of the friction element. To remove the spring, this order of operations is simply reversed, the portion 50 is resilient to move away from the hook 60, the hook 60 is releasable or disengageable from the portion 50 in order to remove the spring 46 from the friction element slot.

The spring 46 is preferably mounted on the side against which the friction element is braced during rotation of the disc 18 in the direction corresponding to forward motion of the vehicle. In an alternative embodiment (not shown), however, a spring of the same type as the spring 46 may be provided at each end of the friction element.

In the embodiment just described, each friction element is substantially symmetrical relative to the radial plane passing through the point of application of the force generated during frictional contact between this element and the disc, and the elements are therefore reversible.

Referring now to FIGS. 7 to 12 of the drawings, the elements performing the same function as in the first embodiment are designated by the same reference numberal increase by 100.

FIGS. 7 to 10 illustrate a disc brake of the same type as the disc brake described with reference to FIGS. 1 to 3 of the first embodiment.

As in the previous embodiment, an anti-noise spring 146 is mounted on each of the friction elements 122 and 124 in such a way that the spring 146 forms with the corresponding friction element a sub-assembly removable as a unit from the remainder of the brake.

Each spring 146 comprises means to lock it axially with respect to the backing plate 145 of the correponding friction element. These means comprise two arms 148 and 150 substantially parallel therebetween and disposed adjacent the respective faces of the backing plate 145. Each spring 146 further comprises an arm 152 extending from arm 150 through one of two apertures 142 formed in the backing plates 145.

The arm 152 of each spring cooperates with the corresponding arm 148 through releasable locking means. These means are comprised in this embodiment of an other arm 154 extending radially inwards into the brake and receiving the arm 148 in such a way that the arm 152 is urged resiliently against the edge of the aperture 142 directed towards the exterior of the brake thanks to the resilient force stored in the arms 150 and 148 when the sub-assembly constituted of each friction element and of its respective spring is mounted on the brake. Furthermore, each of the springs 146 cooperates with an anchoring surface, constituted in this embodiment by the surface 141 formed on the key 130, by a curved and convex portion 156 comprised of another arm of the spring. The radius of curvature of the portion 156 is substantially constant in such a way that the contact between the spring and the caliper 110 is only performed through a reduced surface whatever the inclination of the corresponding friction element. The spring further cooperates through another arm 160 with a circumferentially extending edge 158 of the backing plate 145. The arms 150, 152, 148, and 156 define substantially a rectangle, the arm 148 extending beyond the rectangle until the arm 160, an arm 162 further extending from the free end of arm 160. The arm 162 extends radially inwards into the brake and is disposed adjacent the corresponding face of the backing plate 145. Thus, the arm 152 constitutes with the arms 148 and 150 the means to lock axially the spring with respect to the plate 145.

Figure 8:
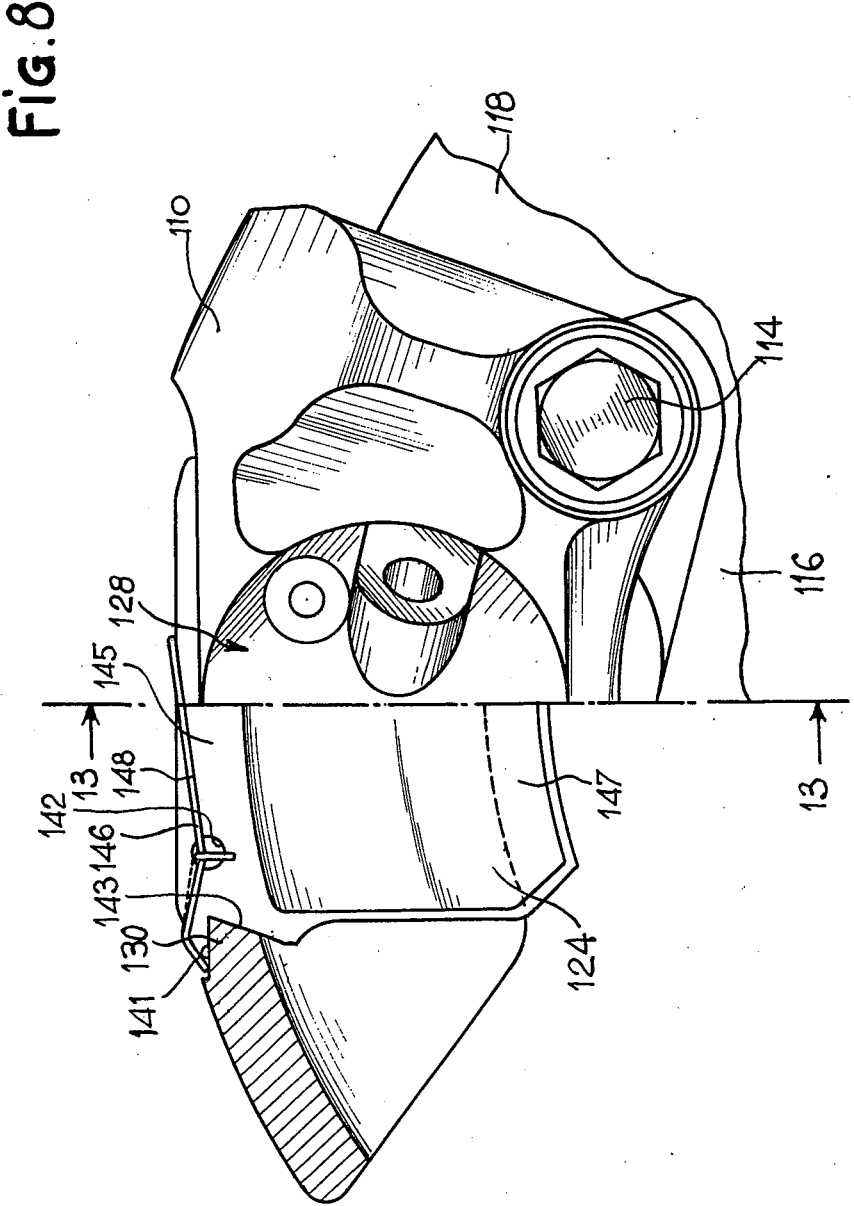
FIG. 8 is a view half in section along a line 12–12 in FIG. 7.
Figure 9:
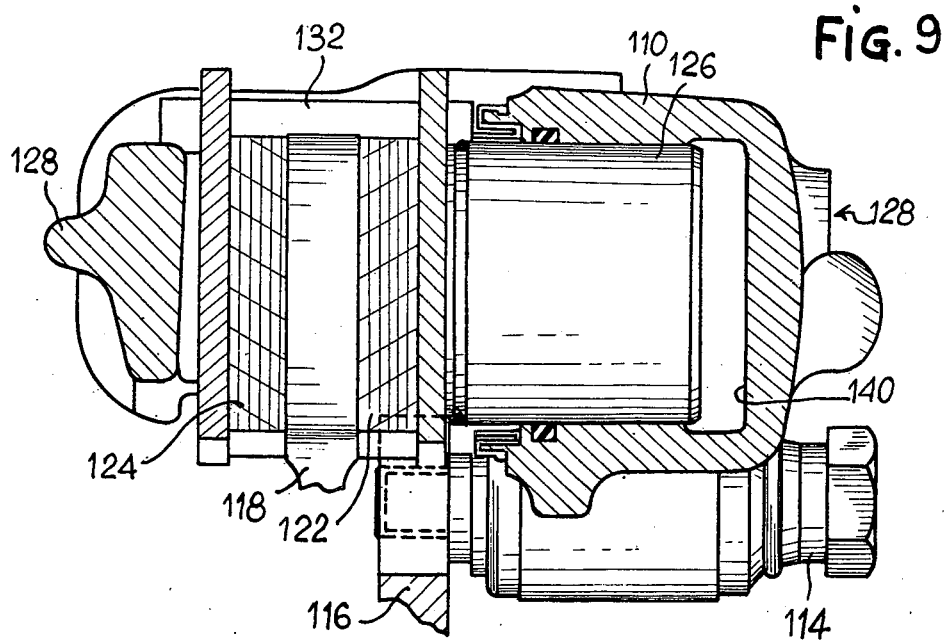
FIG. 9 represents a section along a line 13–13 in FIG. 8.
Figure 10:
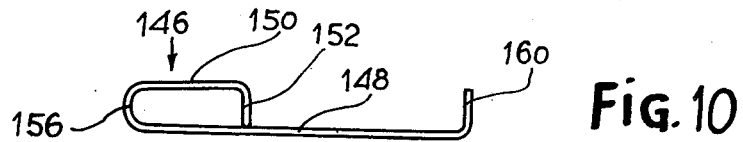
FIG. 10 is a plan view of the noise-reducing spring used in the brake shown in FIGS. 7 to 9.
Figure 11:
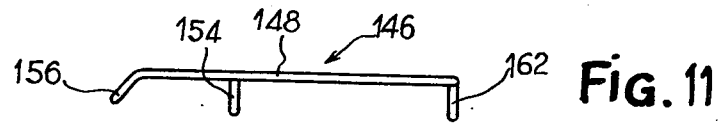
FIG. 11 is a side view of the spring shown in FIG. 10
Figure 12:
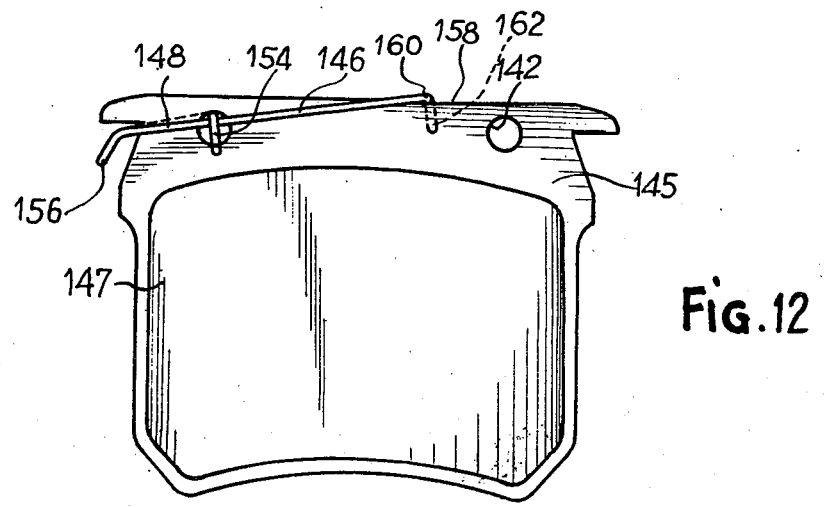
FIG. 12 illustrates how a brake pad and noise-reducing spring may be assembled before being installed in the brake shown in FIGS. 7 to 9.

As shown in FIGS. 10, 11, and 12 the arms 148, 150, 152, 154, 160 and 162 of the spring 146 are substantially rectilinear and perpendicular therebetween when the spring is idle, i.e. when it is alone or mounted onto the backing plate 145 of the corresponding friction element. However, as FIG. 8 shows, the arm 148 is substantially V-shaped when the sub-assembly comprised of the spring and of the friction element is installed in the brake.

The brake described with reference to FIGS. 7 to 12 of the drawings operates in the same way than the brake described in the previous embodiment.

It will be noted that the particular form of the arms 156 avoids the springs 146 to exert a parasite torque on the friction elements 122 and 124.

As in the first embodiment, the mounting of springs 146, the form of which springs before mounting being shown in FIGS. 10 and 11, is particularly simple and preferably performed before mounting of the friction elements on the remainder of the brake, in such a way that the springs 146 are changed when the friction linings are wear, thus avoiding a too long use of these springs.

Upon mounting of the spring 146 on the corresponding friction element, the arms 152 and 154 are inserted into one of the apertures 142. The arm 146 is then placed under the arm 154 as shown in FIG. 10, the arms 162, 148 and 150 axially locking the spring with respect to the packing plate 145 of the corresponding friction element. The sub-assembly comprised of the friction element and of the corresponding spring is then inserted through the slots 134 and 136 provided in the radial aperture 120 of the caliper, which insertion is easily performed.

Although the described embodiments of the invention refer to disc brakes of the sliding caliper type, the invention is not limited to this type of brake and can also be applied to disc brakes of the sliding frame type or to disc brakes of the fixed caliper type. The invention is neither limited to a disc brake in which the friction elements are symmetric and anchor on keys of the described type. In the same way, the portion 56, 156 of the springs can cooperate with an anchoring surface on the torque taking member other than one of the guiding surfaces of the friction elements.

What we claim is:
1. A disc brake comprising:
   a rotary disc having a pair of friction faces;
   a pair of friction elements each having a backing plate carrying friction linings facing respective friction faces on said disc;
   a torque-taking member having actuation means urging said friction elements into engagement with the friction faces;
   said torque-taking member having guiding surfaces which carry and anchor said friction elements;
   at least one spring cooperating with said friction elements to resiliently urge the latter radially outwardly;
   said one spring having two first arms facing respective surfaces on the backing plate and extending substantially parallel to the friction faces, at least one second arm extending into an aperture between the surfaces on the backing plate, at least one third arm engaging the guiding surface on the torque member and at least one fourth arm engaging the backing plate;
   said second arm extending from one of the first arms facing one of the surfaces to the other of the first arms facing the other of the surfaces and releasably engaging the other of the first arms facing the other surface to attach said one spring to said friction element;
   said second arm and said other of the first arms being disengageable from each other to permit said second arm to withdraw from the aperture while the one of the first arms remains connected to the other of the first arms.
2. The disc brake of claim 1 in which said second arm includes a portion that is bent radially inwardly to from a hook, said hook receiving the other of the first arms which is facing the other surface of the backing plate and releasably engaging the same first arm.
3. The disc brake of claim 1 in which said second arm comprises a U-shaped portion of the one of the first arms facing the one surface of the backing plate, said U-shaped portion extending through the aperture in the backing plate and bending radially inwardly near the other surface of the backing plate to releasably engage the other of the first arms facing the other surface.
4. The disc brake of claim 1 in which said third and fourth arms interconnect with said first arms to substantially form the boundary of a rectangle.
5. The disc brake of claim 1 in which said other of the first arms extends from said fourth arm engaging the backing plate to said third arm engaging the guiding surface along the other surface of the backing plate.
6. The disc brake of claim 1 in which said second arm extends from the one of the first arms facing the one surface of the backing plate to the other of the first arms facing the other surface of the backing plate to form the boundary of a rectangle with each third and fourth arms.
7. The disc brake of claim 1 in which said third arm includes a portion that is bent radially inwardly to engage the guiding surface on the torque taking member.
8. The disc brake of claim 1 in which said third arm of the spring is curved, said curved third arm engaging the guiding surface on the torque taking member.

* * * * *